April 21, 1964 P. D. SCHWARZ 3,130,298
ELECTRICAL REMOTE INDICATING SYSTEM
Filed Dec. 18, 1961 4 Sheets-Sheet 1

*INVENTOR.*
PETER D. SCHWARZ
BY
*Attorney*

April 21, 1964 P. D. SCHWARZ 3,130,298
ELECTRICAL REMOTE INDICATING SYSTEM
Filed Dec. 18, 1961 4 Sheets-Sheet 4

*INVENTOR.*
PETER D. SCHWARZ
BY
*Attorney*

United States Patent Office 3,130,298
Patented Apr. 21, 1964

3,130,298
ELECTRICAL REMOTE INDICATING SYSTEM
Peter D. Schwarz, 61 Woodcrest Drive, Rochester 10, N.Y.
Filed Dec. 18, 1961, Ser. No. 160,215
1 Claim. (Cl. 235—92)

This invention relates to a novel electrical circuit arrangement for indicating the positions of plural multi-position switches at locations remote from the switches, and, more particularly, to a novel circuit arrangement of this type which is especially suitable for use as a selective readout circuit in a system wherein digital information is stored simultaneously in separate banks of electrical switches such as, for example, in vehicle counting systems arranged for keeping track of the number of vehicles entering and leaving various different parking areas of a parking garage or similar facility.

In systems of this general type, counting information for each separate parking area of a large garage or the like may be stored in a counter, or accumulator, which includes, or may consist solely, of a multi-position electrical switch having one or more movable contacts. The count information consists of the accumulated algebraic total of the individual unit counts fed to the counter, and is indicated at any given moment by the positions of the movable switch contacts at that moment. In systems that include several separate accumulators, it is often desired to provide for selective readout of the information stored in the respective different accumulators at various different locations remote from the accumulators themselves.

The present invention provides a novel and ingenious circuit arrangement for this purpose using a relatively small number of electrical conductors connecting the accumulators with the various different remote readout stations.

Accordingly, one important object of the present invention is to provide a novel remote readout electrical circuit arrangement for producing an indication of the positions of selected ones of plural multi-position switches.

Another object is to provide a novel circuit arrangement of this type which is of relatively simple construction and requires only a relatively small number of separate electrical conductors connecting the switches to the readout locations.

Another object is to provide a novel circuit arrangement of this type in which the corresponding fixed contacts of all of the multi-position switches are connected together so that for each group of corresponding contacts only a single conductor need be provided leading from the remote readout locations to all of the switches.

Another object is to provide a novel circuit arrangement of this type including a master readout station and means at the master station for automatically indicating in predetermined sequence the positions of all of the multi-position switches in the system.

Still another object of the invention is to provide a novel arrangement for automatically reading all of the accumulators in sequence and storing the information so procured by making a printed record of it or by feeding it to a storage device of any other desired type.

The foregoing and other objects and advantages of the invention will become apparent in the following detailed description of a representative embodiment thereof, taken in conjunction with the drawings, wherein.

Figure 1:
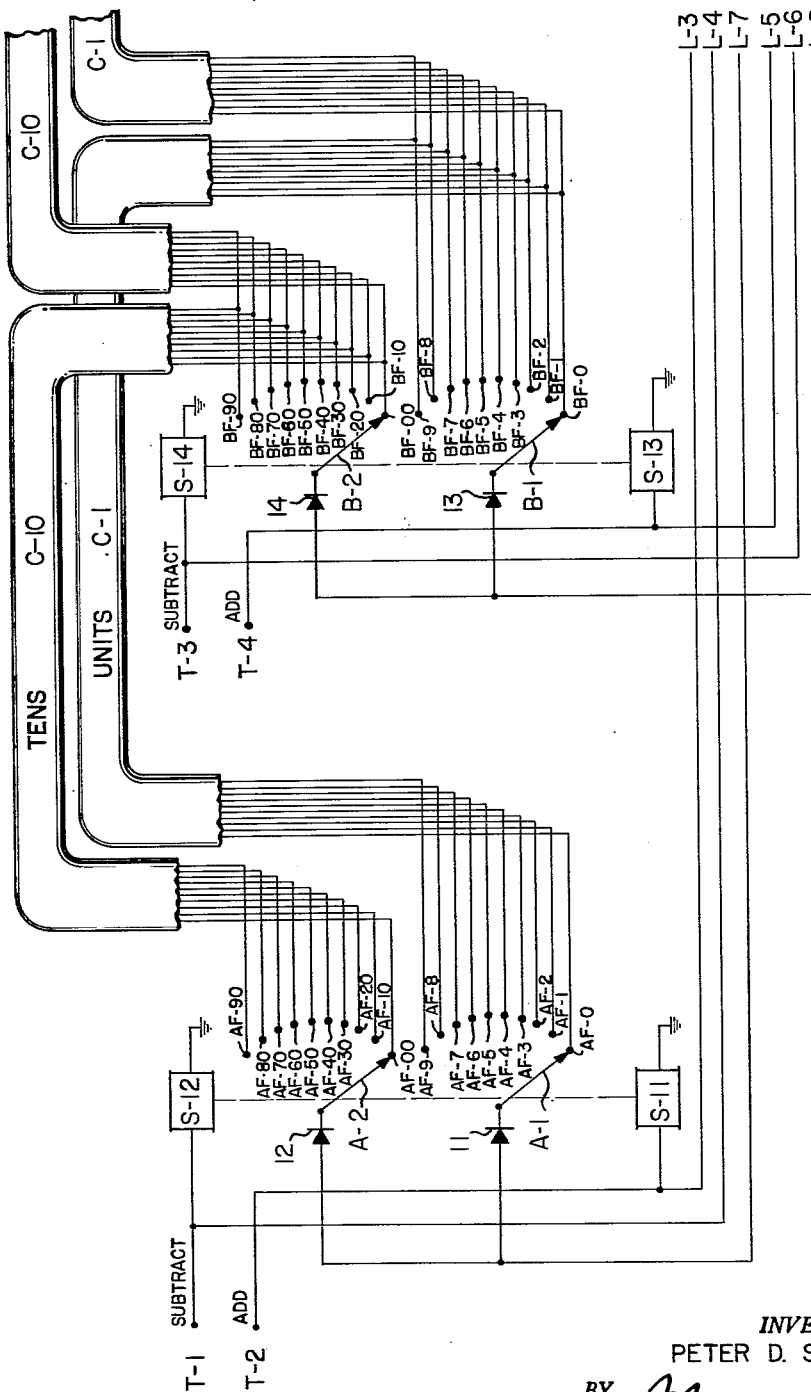
FIG. 1 is a schematic circuit diagram of a portion of the readout circuit constructed according to one embodiment of the invention, showing two separate counters, or multi-position switches, used for storing vehicle count information for respective areas in a parking garage or like facility.

Briefly, according to the present invention corresponding fixed contacts on all of the counters, or multi-position switches of the system, are connected together and also to corresponding terminals at jacks, which are located at the readout locations. Thus, if the counters are arranged according to the decimal system to count from zero to ninety-nine, each counter will ordinarily include two movable contacts and twenty fixed contacts. In the system of the invention, a single multi-conductor cable connects all of the counters with all of the readout stations, and includes only a single conductor for each one of the twenty fixed contacts, regardless of how many multi-position switches, or counters are included in the system, or how many readout locations. The fixed contact conductors in the common cable are common to all of the various different counters and readout jacks in the system. One or more separate conductors are also included in the common cable from each one of the counters to all of the readout stations at which it is desired to provide count information for the particular counters. As will be apparent hereinafter, the number of such separate conductors depends upon the number of additional functions it is desired to provide in the system. For readout purposes alone, only a single separate conductor is required for each counter.

The arrangement is relatively simple and inexpensive; and requires only a relatively small number of electrical conductors; it is simple to install; and it provides rapid selective readout information from as many different counters as desired, and at as many different locations as desired.

Referring now to the drawings, FIGS. 1, 2, 3, and 4 are contiguous portions of a single circuit diagram, and are arranged to be placed end to end to provide a complete diagram of the illustrative circuit according to the invention. For the sake of simplicity and ease in understanding the invention and in following the schematic diagram, only two counters are shown, and only three remote readout jacks, and the counters are shown as each including only two banks of fixed contacts for counting from zero to ninety-nine. However, any desired number of counters, and of readout jacks may be included; and the counters may include as many digit positions as desired, all according to the general principles described herein.

Energizing current sources throughout the drawings are denoted by the simple plus (+) in order to avoid undue drafting complexity.

The counters A and B shown in FIG. 1 are arranged for algebraically accumulating total add and subtract counts, which are indicated by momentary electrical signals applied to the input terminals T-1, T-2, T-3, and T-4. The signals may, for example, indicate vehicles entering and leaving, respectively, separate parking areas of a parking garage, or any other desired digital information capable of being presented in the form of momentary electrical signals.

The counter A is indexed one step in one direction in response to energization of a first, or add solenoid S–11, and one step in the opposite direction in response to energization of a second, or subtract solenoid S–12. The solenoids S–11 and S–12 are electrically connected separately to the respective input terminals T–1 and T–2, and are mechanically connected to the first movable contact A–1 of the counter A for selectively indexing the contact A–1 forward or back. A conventional mechanical decade linkage is provided between the first movable contact A–1 and the second movable contact A–2 for indexing the second contact A–2 one step in a given direction only after the first movable contact A–1 has been indexed ten steps in the same direction. The positions of the movable contacts A–1 and A–2, therefore, represent the algebraic sum of the various successive count signals applied at the input terminals T–1 and T–2, respectively, over a period of time.

The input signals applied to the terminals T–1 and T–2 may, for example, be taken from a counting system of the type shown in my copending application, Serial No. 817,235, filed June 1, 1959, and entitled Traffic Counting Apparatus. The system described in that application produces separate momentary add and subtract signals at separate respective terminals. These signals may be applied respectively to the input terminals T–1 and T–2, a subtract signal, for example, being applied to the first input terminal T–1 to indicate a vehicle entering the particular parking area, and an add signal being applied to the second input terminal T–2 to indicate a vehicle departing from the parking area, so that the position of the counter indicates the total number of available parking spaces in the particular area at any given moment. Thus, if ten vehicles leave the parking area without any vehicle entering the area, the movable contact A–1 will be moved by the solenoid S–11 in successive steps from fixed contact AF–0 to AF–1, to AF–2, to AF–3, to AF–4, to AF–5, to AF–6, to AF–7, to AF–8, to AF–9; and then movable contact A–2 will move from fixed contact AF–00 to AF–10, and movable contact A–1 will reset to fixed contact AF–0, ready to count the next vehicle leaving the area. Thus, for each ten spaces made available in the parking area, the movable contact A–2 will be advanced one step. If vehicles enter the area, the solenoid S–12 will effect stepping of the movable contacts A–1 and A–2 in the reverse direction.

The second counter B is exactly similar to the first counter A, and is arranged to be indexed by respective add and subtract solenoids S–13 and S–14 in response to momentary electrical signals applied to their respective input terminals T–3 and T–4.

The counters A and B may be of any desired decade type such as the counters described in an article at page 1032 of the June 1958 issue of Instruments and Automation, vol. 31, No. 6, and entitled Numerical Readout.

The respective fixed contacts AF–0, AF–1, through AF–9 of the first bank of the first counter A are connected to respective conductors (not separately designated) in the units group C–1 of the common cable and the respective fixed contacts BF–0, BF–1, through BF–9 of the first bank of the second counter B are connected to the same respective conductors. Similarly, the fixed contacts AF–00 through AF–90 of the second bank of the first counter A, and the fixed contacts BF–00 through BF–90 of the second bank of the second counter B are connected to corresponding conductors (not separately designated) in the tens group C–10 of the common cable. The corresponding fixed contacts of the two counters A and B are, therefore, directly connected together through the common conductors of the units and tens groups C–1 and C–10, respectively, which are physically combined to form a single common cable, although they are shown schematically separate for greater clarity.

Figure 2:
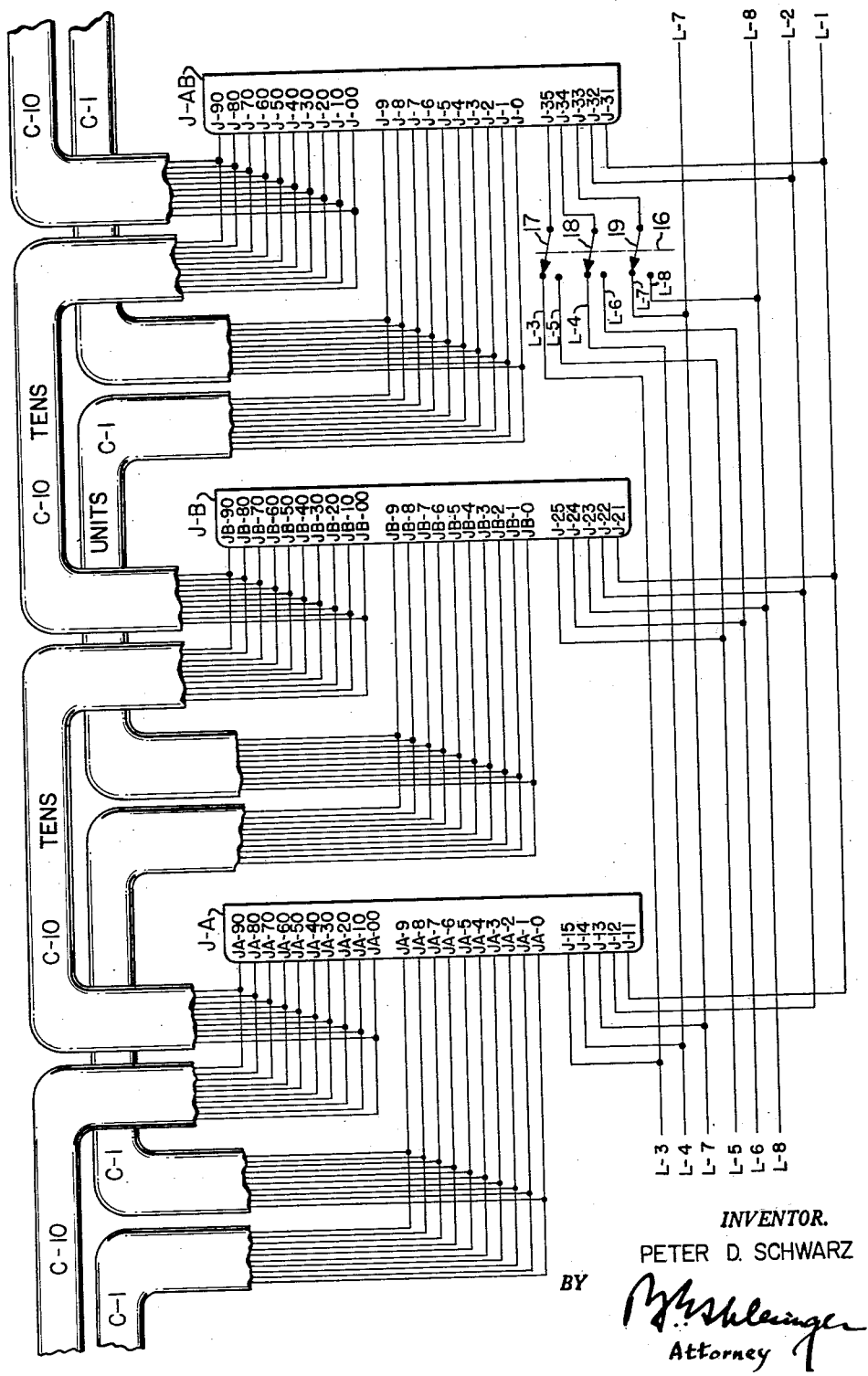
FIG. 2 is a schematic circuit diagram of another portion of the circuit, showing three readout jacks, which may all be remote from each other and from the counters.

Jacks J–A, J–B, and J–AB are provided at three spaced readout locations, as diagrammatically indicated in FIG. 2. Each one of the jacks J–A, J–B, and J–AB includes a separate terminal for each one of the fixed contact conductors in the two groups C–1 and C–10, plus three additional terminals for each one of the counters it is desired to read at the particular jack, and two auxiliary terminals, the purpose of which will be explained hereinafter.

The first jack J–A, as shown, is connected for reading the first counter A. The second jack J–B is connected for reading the second counter B, and the third jack J–AB is connected for selectively reading both counters A and B. One terminal J–13 in the first jack J–A is connected to both movable contacts A–1 and A–2 of the first counter A through a conductor L–7 and through respective diodes 11 and 12, which are series connected with the movable contacts A–1 and A–2 to prevent undesired feed-back between the counters A and B and between the bank of the respective counters.

Similarly, one terminal J–23 of the second jack J–B is connected by the conductor L–8 through respective diodes 13 and 14 to the movable contacts B–1 and B–2 of the second counter B. The third jack J–AB includes a terminal J–33, which may be selectively connected through a switch 16 to either one of the conductors L–7 and L–8 according to which one of the two counters A and B it is desired to read at the third jack J–AB.

In the event more than two counters are included in the system, the switch 16, instead of being a two-position switch would include as many positions as there are counters, and the terminal J–33 would be connected through the switch to the movable contacts of a different one of the counters for each different position of the switch 16.

Figure 5:
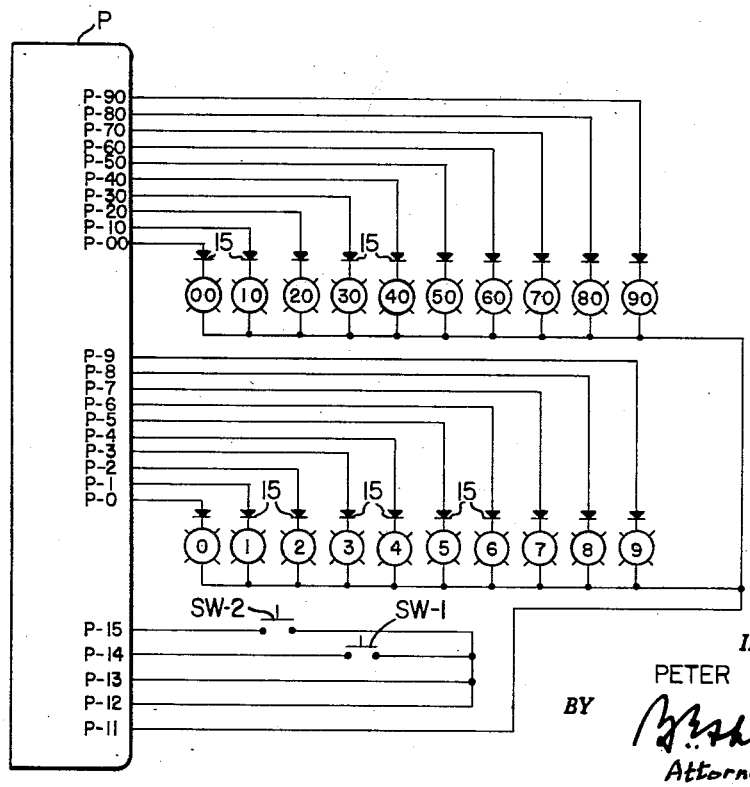
FIG. 5 is a schematic circuit diagram of an indicating unit adapted for selective plug-in connection to the readout jacks to provide visual indication of the counter positions.

The schematic diagram of FIG. 5 represents an indicator unit wired to a plug P, which is adapted to be plugged into any one of the jacks J–A, J–B, and J–AB, for producing a visual indication of the position of the particular counter A or B, depending upon the connection of the terminal J–13, J–23, or J–33 of the jack into which the plug P is inserted. The terminals P–0 to P–9, P–00 to P–90, and P–11 to P–15 of the plug P are arranged to make electrical contact with the respective correspondingly numbered terminals of any one of the jacks J–A, J–B, and J–AB when the plug P is inserted in the jack.

The indicator may be of any desired type such as one of those illustrated in the hereinabove-identified article in the Instruments and Automation publication, and includes a separate indicator lamp 0 to 9 and 00 to 90 for each one of the digits it is desired to indicate in obtaining a reading of the counters. One terminal of each one of the lamps is connected through a separate diode 15 to the corresponding terminal P–0 to P–9 and P–00 to P–90 of the plug P. The opposite terminals of the lamps are connected together and to a common terminal P–11 on the plug.

When the plug P is plugged into one of the jacks J–A, J–B, or J–AB, the terminal P–11 of the plug makes an electrical connection with the corresponding terminal J–11, J–21, or J–31 of the particular jack. All of the jack terminals J–11, J–21, and J–31 (FIG. 2) are connected to a common lead L–1, which is connected through a normally closed relay contact RE–5A (FIG. 3) to the negative, or ground terminal of the system. Selected indicator lamps 0 to 9 and 00 to 90 will then be illuminated when the plug P is plugged into any one of the jacks J–A, J–B, or J–AB in accordance with which of the individual conductors in the unit group C–1 and the tens group C–10 of the common cable are connected through the movable contacts of the selected counter and through the circuits described in the following paragraph to the positive, or energizing terminal of the system.

Figure 3:
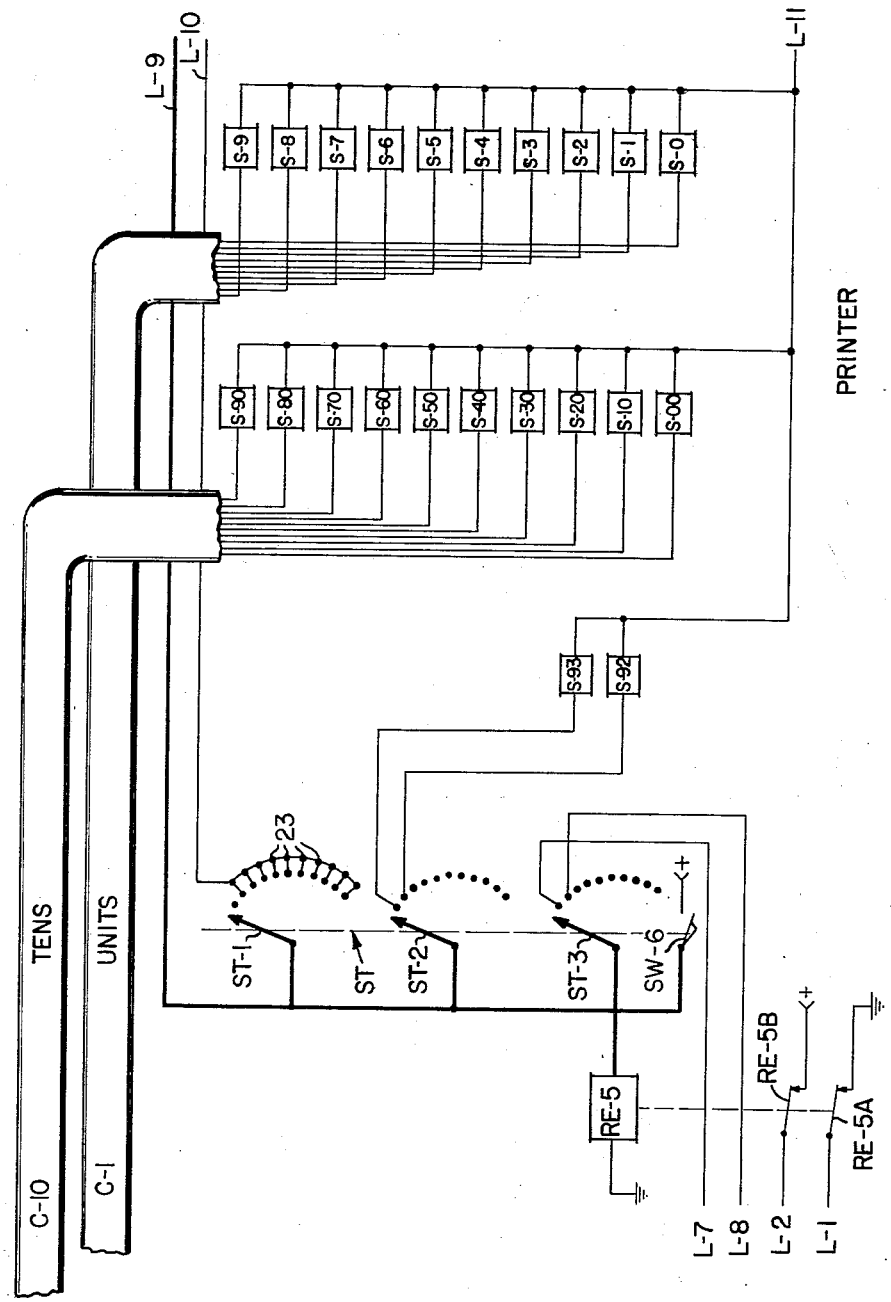
FIG. 3 is a schematic circuit diagram of still another portion of the circuit, showing a portion of the automatic sequential readout arrangement.

One terminal J–12, J–22, and J–32 in each one of the jacks J–A, J–B, J–AB, is connected through a common lead L–2 (FIGS. 2 and 3) to the energizing terminal through a normally closed relay contact RE–5B (FIG. 3). The jack terminals J–12, J–22, and J–32 are, therefore, normally energized, i.e. they are normally maintained at a positive potential relative to ground. The corresponding terminal P–12 of the plug P (FIG. 5) is directly connected to the terminal P–13 so that when the plug P is inserted into one of the jacks J–A, J–B, and J–AB, the energized jack terminal J–12, J–22, or J–32 is connected to the adjacent jack terminal J–13, J–23, or J–33. These terminals J–13, J–23, and J–33 are connected respectively or selectively to the respective movable contacts A–1 and A–2, or B–1 and B–2 of the counters through the conductors L–7 and L–8 (FIGS. 2 and 1). In the upper position of switch 16, shown in FIG. 2, the terminal J–33 is connected to conductor L–7 through arm 19 of the switch. When the switch 16 is moved downwardly, arm 19 disconnects terminal J–33 from conductor L–7 and connects it to conductor L–8.

Assuming, for example, the plug P to be inserted in the first jack J–A, and the first counter A to be positioned to read a count of twenty-four, the indicator lamps 20 and 4 will be energized. The energized circuit under these assumed conditions is from the positive terminal shown in FIG. 3, through the normally closed relay contact RE–5B, the conductor L–2, the jack terminal J–12, the plug terminals P–12 and P–13, the jack terminal J–13, the conductor L–7, the diodes 11 and 12, the movable contacts A–1 and A–2, the fixed contacts AF–20 and AF–4, the corresponding conductors on the common cable, the jack terminals JA–20 and JA–4, the plug terminals P–20 and P–4, the lamps 20 and 4, the plug terminal P–11, the jack terminal J–11, the conductor L–1, and the normally closed relay contact RE–5A, to ground.

Given only one indicator unit for the system, only one counter may be energized at any one time, and the positions of its movable contacts A–1 and A–2, or B–1 and B–2 will then determine which of the individual conductors in the units and tens groups C–1 and C–10, respectively, become selectively energized to energize one of the lamps 0 to 9, and 00 to 90 in each row in the indicator. The indicator unit thus produces a visual display showing the instantaneous position of the selected counter.

*Counter Correction Arrangement*

It is sometimes desirable, particularly in parking installations or the like, to re-set the counters in accordance with information obtained locally in the vicinity of one of the readout jacks, thereby to make correction for ossacional errors in the count producing system, which produces the signals supplied to the input terminals T–1, T–2, T–3, and T–4.

For this purpose, separate conductors L–3, L–4, L–5, and L–6 (FIGS. 1 and 2) are provided connecting the input terminals T–1, T–2, T–3, and T–4, respectively, to the various different jacks (FIG. 2) at which the respective counters are to be read. The conductors L–3 and L–4, for example, lead from the respective first counter input terminals T–1 and T–2 (FIG. 1) to terminals J–14 and J–15 (FIG. 2) of the jack J–A, which is connected for reading only the first counter A. The conductors L–3 and L–4 are also connected to respective fixed contacts (not separately designated) of the switch 16 for selective connection to and disconnection from the terminals J–34 and J–35 of the third jack J–AB, which is the master jack connected to read both of the counters A and B selectively. The conductors L–3 and L–4 are connected to the terminals J–34 and J–35 when the arms 17 and 18 of the switch 18 are in the positions shown in FIG. 2, and are disconnected from the terminals when the switch is moved downwardly from the position shown in FIG. 2.

Similarly, the conductors L–5 and L–6 leading from the terminals T–3 and T–4, which are the input terminals of the second counter B, are connected to separate terminals J–24 and J–25 of the second jack J–B and to separate fixed contacts (not separately designated) of the multi-position switch 16 for selective connection to and disconnection from the terminals J–34 and J–35 of the third jack J–AB. The lines L–5 and L–6 are both disconnected from the jack J–AB when the arms 17 and 18 of switch 16 are in the positions shown in FIG. 2, but are connected to the terminals J–35 and J–34 of jack J–AB when the switch is moved downwardly from the position shown.

The jack terminals J–14 and J–15, J–24 and J–25, and J–34 and J–35 connect with the corresponding terminals P–14 and P–15 of the plug P when the plug is inserted in the jacks. The plug terminals P–14 and P–15 (FIG. 5) are connected through manually operatable, momentary contact, push button switches SW–1 and SW–2 respectively, to the plug terminal P–12, which connects to the normally energized jack terminals J–12, J–22, and J–32. When the plug is in one of the jacks J–A, J–B, or J–AB, the push buttons SW–1 and SW–2 may be selectively actuated, therefore, to produce simulated count signals for actuating the corresponding solenoids S–11, S–12, S–13, or S–14 (FIG. 1) of the counter A or B being read at the jack.

*Sequential Readout Feature*

Figure 4:
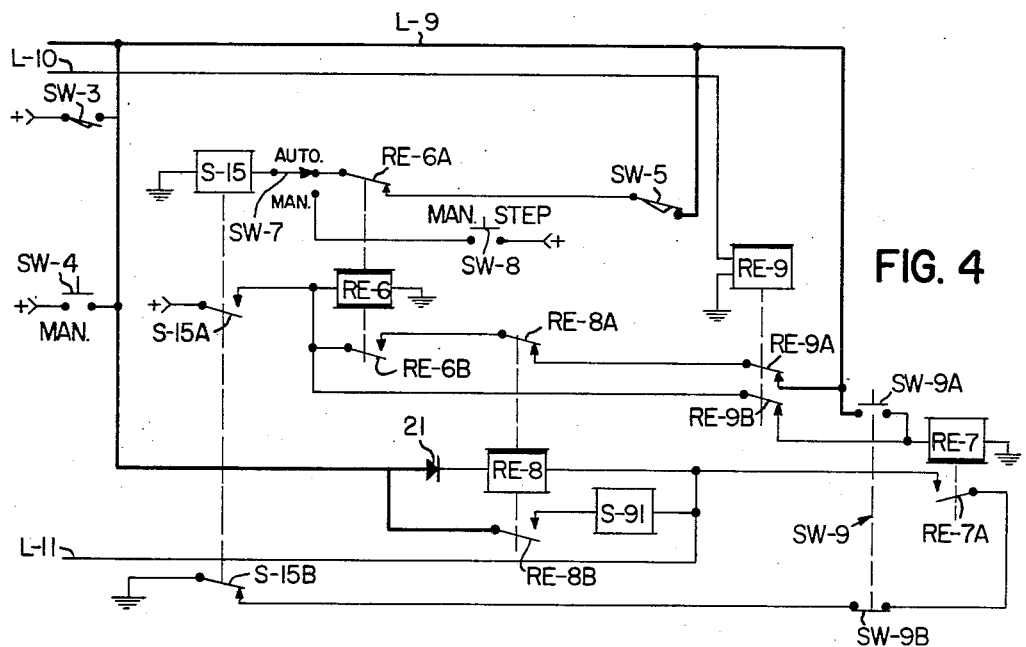
FIG. 4 is a schematic circuit diagram of another portion of the automatic sequential readout circuit arrangement.

One circuit arrangement for the automatic sequential readout feature of the present invention is illustrated in FIGS. 3 and 4, and includes an electrically actuatable printer having separate respective solenoids S–0 to S–9, S–00 to S–90, and S–92 and S–93 for actuating numerical input actuators, or keys (not shown). The printer also includes a separate solenoid S–91 (FIG. 4) for actuating a print bar (not shown) to cause the printer to print after selected ones of the numerical keys have been actuated.

The printer (not shown) may be of any desired type having separate electrical terminals for each one of the individual conductors in the respective units and tens groups C–1 and C–10. In the present example, the printer is assumed to be of the type having keys, or actuators, which latch mechanically in response to momentary energization of the respective solenoids S–0 to S–9 and S–00 to S–90, and remain latched until sometime during or immediately following the mechanical printing cycle, which is initiated by momentary actuation of the print bar.

The printer solenoids S–0 to S–9 and S–00 to S–90 are connected to the respective conductors of the units and tens groups C–1 and C–10, respectively, for selective energization through the counters A and B during times when the common terminals of the solenoids are connected to ground through their common lead L–11.

A stepping switch ST (FIG. 3) is included in the circuit for selectively energizing the counters A and B in predetermined sequence, and for selectively energizing the code, or counter identifying solenoids S–92 and S–93 of the printer to provide a printed indication identifying the printed count information with the particular counter A or B from which it is taken.

The stepping switch ST is of the spring driven type, and is indexed one step forwardly by a drive spring (not shown) which is energized by the stepper solenoid S–15 (FIG. 4). The stepping switch ST advances one step only after the stepper solenoid S–15 is energized and subsequently deenergized.

The stepping switch ST includes three movable contacts ST–1, ST–2, and ST–3 (FIG. 3), each arranged for indexing along a separate bank of fixed contacts. The stepping switch ST has at least one more position than the number of counters in the system to be read, and may, as illustrated, have several spare positions to accommodate future counters, in which case a homing circuit is provided so that after all of the counters are automatically read in sequence, the stepping switch returns to its normal starting, or home position.

The automatic sequential readout feature is designed to be normally inactive, and to operate only periodically upon command, which may be automatically produced by a clock mechanism (not shown) arranged for momentarily actuating a switch SD–3 (FIG. 4) at periodic intervals. Alternatively, the command may be given by manual momentary operation of a push button SW–4.

The readout sequence is initiated by momentarily closing the clock-actuated switch SW–3, or the manually-actuated switch SW–4. Closing of either one of these switches SW–3 or SW–4 connects the heavy line conductor L–9 to the positive terminal of the system (not separately designated) and energizes the conductor L–9 for a sufficient length of time to complete the energization of the stepper solenoid S–15, which is connected between ground and the conductor L–9 through a normally closed switch SW–5 in the printer and a normally closed contact RE–6A of a slow-to-operate and slow-to-release relay RE–6, called the pulsing relay. When the solenoid S–15 is energized, it closes a contact S–15A to apply an energizing potential to the pulsing relay RE–6. The delay between the energization and the resulting pick-up of the pulsing relay RE–6 is selected to allow time for the stepping solenoid S–15 to retract the stepping switch spring fully.

When the relay RE–6 picks up, it opens its contact RE–6A, which is in series with the solenoid S–15, thereby deenergizing the stepper solenoid S–15 and causing the stepping switch ST to index from its home position to its first operating, or count position.

The stepping switch ST also includes a so-called OFF-NORMAL contact SW–6 (FIG. 3), which remains closed during the counting cycle, and is open only during times when the stepping switch is in its home position. The OFF-NORMAL contact SW–6 closes as soon as the stepping switch ST indexes away from its home position. The OFF-NORMAL contact SW–6 is connected between the conductor L–9 and the energizing source, and serves to keep the conductor L–9 constantly energized while the stepping switch ST is away from its home position. The conductor L–9, therefore, remains energized throughout the automatic readout cycle once the stepping switch ST has left its home position, and becomes deenergized only when the stepping switch ST returns to its home position.

An auxiliary relay RE–5 (FIG. 3) called the cut-off relay is connected between the conductor L–9 and ground for opening the normally closed contacts RE–5A and RE–5B during times when the conductor L–9 is energized, that is, for the duration of the automatic readout sequence. The contact RE–5B is connected in series between the current source and the line L–2, which is connected to the normally energized jack terminals J–12, J–22, and J–32. The other contact RE–5A is connected between ground and the grounding jack terminals J–11, J–21, and J–31. When the contacts RE–5A and RE–5B open, the jacks J–A, J–B, and J–AB are disabled, and cannot be energized. The cut-off relay RE–5 thus operates to prevent an erroneous automatic readout, which might otherwise occur if the indicator shown in FIG. 5 happens to be plugged into one of the jacks during the automatic readout cycle.

The cut-off relay RE–5 also ensures against accidental application to the indicator unit of the energizing voltage used for the sequential readout system. This is especially important in cases where voltages of different values are used for the indicator and for the sequential readout system, because in such event, accidental cross-application might burn out the indicator lamps 0 to 9 and 00 to 90, or the print solenoids S–0 to S–9 and S–00 to S–90.

The third movable contact ST–3 (FIG. 3) of the stepping switch selectively connects the energized conductor L–9 to the conductors L–7 and L–8, thereby to energize the selected counter A or B and selected ones of the units and tens conductors in accordance with the position of the counter being interrogated. The second movable contact ST–2 of the stepping switch is also connected to the conductor L–9 for selectively energizing the coding solenoids S–92 and S–93, which are connected between respective fixed contacts of the second bank of the stepping switch and ground.

A timing relay RE–7 (FIG. 4) having slow release characteristics is connected in parallel with the pulsing relay RE–6 through a normally closed relay contact RE–9B, and is energized simultaneously with the pulsing relay RE–6. The energizing circuits for the print relay RE–8, the print bar actuating solenoid S–91, and the print number solenoids S–0 to S–9 (FIG. 3), S–00 to S–90, S–92, and S–93 are all completed through the normally open contact RE–7A (FIG. 4) of the timing relay RE–7, when closed, and through the normally closed contact S–15B of the stepping switch solenoid S–15. The print relay RE–8, and the solenoids S–91, S–0 to S–9, S–00 to S–90, S–92, and S–93, therefore can be energized only during times when the stepping solenoid S–15 is deenergized and the timing relay RE–7 is picked up.

Returning now to the operation of the circuit, both the pulsing relay RE–6 and the timing relay RE–7 are energized by closing of the solenoid contact S–15A when the stepper solenoid S–15 is energized. When the stepper solenoid thereupon becomes deenergized in response to opening of the pulsing relay contact RE–6A, the stepping switch ST indexes to its first operating position, and the solenoid contact S–15B closes. This operation completes circuits for energizing one of the printer solenoids S–0 to S–9 in the units column and one of the printer solenoids S–00 to S–90 in the tens column, in accordance with the position of the first counter A, as follows.

First, the OFF-NORMAL contact SW–6 closes to connect the conductor L–9 to the positive terminal. The conductor L–9 is at this time connected through the third movable contact ST–3 of the stepping switch to the separate conductor L–7, which is connected to the movable contacts A–1 and A–2 of the first counter A. The movable contacts A–1 and A–2 connect respectively to one of the conductors in the units group C–1 and to one of the conductors in the tens group C–10, which lead to the respective separate terminals of the printer solenoids S–0 to S–9 and S–00 to S–90. The common terminals of the printer solenoids S–0 to S–9 and S–00 to S–90 are connected to ground through the conductor L–11, the now closed timing relay contact RE–7A, and the now closed solenoid contact S–15B.

Due to its delayed release characteristic, the pulsing relay RE–6 remains picked up subsequent to the release of the stepper solenoid S–15 until after the OFF-NORMAL contact SW–6 closes to energize the conductor L–9. As soon as the conductor L–9 is energized by the closing of the OFF-NORMAL contact SW–6, the self-holding, or stick circuit for the pulsing relay RE–6 becomes operative. This holding circuit is through the normally closed relay contacts RE–9A and RE–8A and the normally open contact RE–6B.

The print relay RE–8 is connected through a diode 21 between the conductor L–9 and the contact RE–7A of the timing relay RE–7. The energizing circuit for the print relay RE–8 is completed immediately upon closing of the solenoid contact S–15B, because at the time of closing of the solenoid contact S–15B, the timing relay contact RE–7A is already closed, as explained hereinabove. The print relay RE–8 is of the delayed operate type, and does not pick up immediately upon closing of its energizing circuit, but delays sufficiently long to insure complete actuation of the selected number solenoids S–0 to S–9, S–00 to S–90, S–92, and S–93 (FIG. 3) the energizing circuits for which are also completed upon closing of the solenoid contact S–15B. When the print relay RE–8 picks up, it opens its first contact RE–8A and closes its second contact RE–8B. Opening of the first contact RE–8A breaks the holding circuit for the pulsing relay RE–6 and also opens the energizing circuit for the timing relay RE–7. The timing relay RE–7 is of the slow release type, and remains picked up following its deenergization for a sufficient time to permit full actuation of the print bar solenoid S–91. Closing of the second contact RE-8B completes the energizing circuit for the print bar solenoid S-91 to actuate the print bar of the printer.

The switch SW-5 is called the end-of-print switch and is ordinarily built into the printer as a component part of the printer. During the printing process following actuation of the print bar, the printer maintains the end-of-print switch SW-5 in an open condition, allowing it to close only upon completion of printing of the particular entry. The end-of-print switch SW-5 is connected in series with the stepper solenoid S-15, thereby insuring against a subsequent energization of the stepper solenoid S-15 during the time the printer is printing.

The pulsing relay RE-6 due to its selected delay characteristic, does not release until after the start of the printing operation in the printer, and is preferably timed to drop out during the printing interval, that is, during the time the printer is printing and the end-of-print switch SW-5 is open. This facilitates immediate indexing of the stepping switch ST to its next position upon completion of the print cycle.

After the printer finishes printing, the end-of-print switch SW-5 closes. Upon closing of the end-of-print switch SW-5, or of the relay contact RE-6A, which ever happens last, the stepper solenoid S-15 is again energized, and the cycle is repeated, with the stepping switch ST at its next successive position so that the printer solenoids S-0 to S-9 and S-00 to S-90 are energized in accordance with the position of the next successive counter.

After the information from the last one of the counters has been printed, the stepping switch ST indexes rapidly to its home position, and remains there pending the next subsequent actuation of the clock actuated switch SW-3 (FIG. 4) or the manual switch SW-4. The homing operation is accomplished through the first movable contact ST-1 (FIG. 3) of the stepping switch, and its bank of fixed contacts, in conjunction with a homing relay RE-9 (FIG. 4).

The movable contact ST-1 is connected to the conductor L-9, and is, therefore, energized at all times when the stepping switch ST is away from its home position. In the first, or homing bank, of the stepping switch ST, all of the fixed contacts 23, at positions starting with and subsequent to the position corresponding to the last counter, are connected together and through a conductor L-10, to the homing relay RE-9. The homing relay RE-9, therefore, becomes energized as soon as the stepping switch ST indexes following printing of information from the penultimate counter, and remains energized until the stepping switch ST arrives at its home position, at which time the OFF-NORMAL switch SW-6 opens to deenergize the conductor L-9.

During the time the homing relay RE-9 is picked up, its contacts RE-9A and RE-9B are open. These contacts RE-9A and RE-9B are, respectively, in the holding circuit for the pulsing relay RE-6 and in the energizing circuit for the timing relay RE-7. When the contacts RE-9A and RE-9B are open, the pulsing relay RE-6 is not self-holding, and the timing relay RE-7 cannot be energized. The printer solenoids S-0 to S-00, S-00 to S-90, and S-91 to S-93 are also disabled, because their energizing circuits are completed through the normally open contact RE-7A of the timing relay.

The homing relay RE-9 is energized as soon as the stepping relay ST is indexed to the position for energizing the last counter to be read. The pick up delay of the homing relay RE-9 is selected to be slightly longer than the pick up delay of the print relay RE-8 in order to allow time for full actuation of the printer and of the print bar solenoid S-91 to record the information from the last counter. The homing relay RE-9 picks up either simultaneously with, or just prior to the subsequent indexing of the stepping switch ST, thereby insuring against unintended actuation of the timing relay RE-7 when the stepping switch ST indexes to its position next following the last readout position.

After completion of the last printing operation, then, the homing relay RE-9 is picked up, and the end-of-print contact SW-5 closes. The stepper solenoid S-15 then operates in alternation with the pulsing relay RE-6 to index the stepping switch back to its home position, whereupon the OFF-NORMAL contact SW-6 opens, the conductor L-9 becomes deenergized, and the automatic sequential readout circuit becomes inactive pending the next actuation of one of the starting switches SW-3 and SW-4.

The sequential readout system may be converted from automatic to manually controlled operation by throwing a selector switch SW-7 from its first, or AUTOMATIC position to its second, or MANUAL position. The movable contact of the selector switch SW-7 is connected to the stepper solenoid S-15. When it is thrown to the MANUAL position, the selector switch SW-7 connects the stepper solenoid S-15 to the positive terminal of the system through a normal open, manually actuatable switch SW-8. The stepping switch ST can then be stepped under manual control by actuation of the manual stepping switch SW-8, and the printer will operate following each step in response to the sequence of relay operation as described hereinabove.

After the stepping switch ST has been indexed under manual control to select any desired counter, the instantaneous count information from that counter may be printed at frequent intervals, or as desired by momentary actuation of another manually actuatable switch SW-9, thereby producing a printed record of the count information of the selected counter at relatively close intervals. The manual print switch SW-9 includes a normally open contact SW-9A connected directly between the energized conductor L-9 and the timing relay RE-7, and bypassing the normally open contact RE-6B of the pulsing relay. Closing of the contact SW-9A causes the timing relay RE-7 to be energized and to close its contact RE-7A. During the time the manual print switch SW-9 is held in its actuated position, nothing more happens, because its second contact SW-9B remains open. When the switch SW-9 is released, its contact SW-9B closes, and the contact RE-7A of the timing relay remains closed momentarily due to the delayed release characteristic of the timing relay RE-7. During this interval the ground circuits for the printer solenoids S-0 to S-9, S-00 to S-90, S-91, S-92, and S-93 and the print relay RE-8 are closed. This action causes the printer to print the digital information from the selected counter in accordance with the circuit action described hereinabove in connection with the automatic operation.

The manual print switch SW-9 also includes a normally closed contact SW-9B, which is in the ground circuit in series with the timing relay contact RE-7A and the printer solenoids S-0 to S-9, S-00 to S-90, and S-91 to S-93, and the print relay RE-8. This contact SW-9B serves to keep the printer solenoids and print relay circuits open during the time the manual switch SW-9 is held in its actuated position, and thus to prevent undesired continued energization of the printer solenoids, as might otherwise occur during the interval for which the manual switch SW-9 is held in its actuated position. With the normally closed contact SW-9B connected as shown, the printer prints only upon release of the manual print switch SW-9.

It is thus seen that the electrical readout arrangement of the present invention is relatively simple and inexpensive, and requires only a relatively small number of separate conductors because the digit information terminals of all of the counters and all of the readout jacks are connected in parallel through common conductors, which may be arranged to form a single cable. The system is fully accurate, and includes relatively simple safeguards against possible error such as might be caused by feedback through so-called sneak circuits, or by reason of having the indicator unit plugged into a jack during times when the sequential readout system is in operation.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described my invention, what I claim is:

Vehicle counting apparatus for use in keeping count of the number of vehicles or of available spaces in different respective areas of a parking garage or like facility of the type having means for producing electrical signals in response to movement of vehicles into and out of the respective areas, the signals being in the form of relatively short pulses of electrical energy, said apparatus comprising means for applying selected ones of the signals to respective first terminals and other ones of the signals to respective second terminals, electrically actuatable digital count devices connected to said first and second terminals for indexing in a forward direction in response to the selected signals and in a reverse direction in response to the other signals, there being one set of said first and second terminals and one count device for each separate parking area of the garage or like facility, each one of said count devices including a fixed electrical contact for each digit and a movable contact sequentially engageable with said fixed contacts, a jack, an electrically actuatable printer for recording digital information, said printer having a common terminal and separate digit input terminals, means for connecting the digitally corresponding fixed contacts of all of said count devices together and to respective corresponding ones of said input terminals and to corresponding terminals in said jack, a programmer circuit for controlling the operation of said printer, separate conductors connecting the movable contacts of said count devices separately to said programmer circuit and to respective terminals in said jack, an indicator including plural electrically energizable digit indicating devices having a common terminal and separate input terminals, a plug engageable with said jack for selectively connecting said separate terminals of said indicating devices respectively to said corresponding terminals in said jack, means connecting an electric power source between two further terminals in said jack, connections between selected terminals of said plug for connecting one of said further terminals through said jack to a selected one of said separate conductors when said plug is engaged with said jack, said common terminal of said indicator being connectable through said plug to the other one of said further terminals, whereby when said plug is engaged in said jack a selected one of said indicating devices is energized in accordance with the instantaneous position of the movable contact to which said selected separate conductor is connected, said programmer circuit including means for:

(a) connecting one terminal of a two terminal electrical energy source to said common terminal of said printer, (b) connecting the other terminal of the source to said separate conductors in predetermined sequence, (c) actuating said printer in timed relationship to the making of the resulting connections, and (d) disconnecting the power source from said further terminals of said jack while said common terminal of said printer is connected to the source, thereby positively preventing completion of an energizing circuit for said printer through said indicator.

References Cited in the file of this patent

UNITED STATES PATENTS

| | | |
|---|---|---|
| 1,244,634 | Neff et al. | Oct. 30, 1917 |
| 2,314,720 | Leathers | Mar. 23, 1943 |
| 2,319,412 | Leathers | May 18, 1943 |
| 2,549,071 | Dusek et al. | Apr. 17, 1951 |
| 2,558,927 | Brinton | July 3, 1951 |
| 2,620,980 | Brown | Dec. 9, 1952 |
| 2,644,150 | Burn | June 30, 1953 |
| 2,733,008 | D'Andrea et al. | Jan. 31, 1956 |
| 2,942,243 | Bilz | June 21, 1960 |